United States Patent [19]

Capuano

[11] Patent Number: 4,459,074
[45] Date of Patent: Jul. 10, 1984

[54] SOCKET DRIVE

[75] Inventor: Terry D. Capuano, Hinckley, Ohio

[73] Assignee: Russell, Burdsall & Ward Corporation, Cleveland, Ohio

[21] Appl. No.: 330,876

[22] Filed: Dec. 15, 1981

[51] Int. Cl.³ .......................... F16B 23/00; F16B 35/06
[52] U.S. Cl. ..................................... 411/403; 81/461; 411/410
[58] Field of Search ............... 411/402, 403, 407, 408, 411/410; 81/436, 460, 461

[56] References Cited

U.S. PATENT DOCUMENTS

| | | | |
|---|---|---|---|
| 2,969,250 | 1/1961 | Kull | 411/403 |
| 3,295,572 | 1/1967 | Wing | 411/403 |
| 3,584,667 | 6/1971 | Reiland | 411/7 X |
| 4,269,246 | 5/1981 | Larson et al. | 411/403 |

FOREIGN PATENT DOCUMENTS 1298949  7/1969  Fed. Rep. of Germany ........ 81/436

*Primary Examiner*—Thomas J. Holko
*Assistant Examiner*—Thomas J. Dubnicka
*Attorney, Agent, or Firm*—Pearne, Gordon, Sessions, McCoy, Granger & Tilberry

[57] ABSTRACT

A drive cavity for a threaded fastener which is compatible with a variety of wrench drivers having hexagon-based profiles. The drive cavity is a prismatic projection of a multi-, primarily flat-sided, profile having its radially inner margins defined by the mid-sides of a common base hexagon and its radially outer margins defined by six trapezoid sectors each centered on and outlying the corners of the base hexagon.

5 Claims, 6 Drawing Figures

SOCKET DRIVE

BACKGROUND OF THE INVENTION

The invention relates to threaded fasteners and, in particular, to threaded fasteners having sockets for coupling with torque drive tools.

PRIOR ART

A common style of socket head fasteners has a hexagonal cavity for receiving a complementarily shaped hexagonal wrench or bit. The acircular contour of the cavity and mating wrench allows torque to be transmitted between these elements for installation and removal of the fastener. The hexagonal profile from a manufacturing standpoint has the advantage of requiring relatively simple tooling and gauging for its production, since its shape is easily described and measured. A disadvantage of the hexagonal cavity and drive wrench to the user is the high stress concentration points associated with the corners when moderate or relatively high torque loads are imposed by a driving element. This stress concentration often leads to failure of a fastener, the drive element, or both. For example, where a power-operated drive element is under a high level of use, it may quickly wear away at its corners and begin to ream out the cavity of subsequently engaged fasteners. This type of failure can go unnoticed by a hurried user of a power-driven wrench, resulting in improper installation of damaged fasteners.

Hex recess setscrews have the largest practical hex key size to afford the maximum amount of holding power. Because the wall thickness between the hex recess corner and thread minor diameter is very thin, socket corners crack easily when driven by worn hex drivers. When a socket cracks, the setscrew becomes trapped in the tapped hole, making its removal virtually impossible without damaging the mating parts.

The strength and wear limitations of common hexagonal drivers have been recognized, for example, in U.S. Pat. No. 3,584,667 to Reiland. Products incorporating the teachings of this patent are marketed under the registered trademark TORX. This patent teaches the use of a hex-lobular profile, wherein the sharp corners and related drive angles of a hexagon are avoided to increase torque drive capacity. While this hex-lobular profile can reduce stress and related wear problems in the use of fasteners employing it, manufacturing may be somewhat more complicated and potentially more expensive. For example, it is difficult to accurately measure the true profile of the cavity of a fastener or tooling used to make a cavity, since there are no flat faces or sharp corners which can be used as reference points. The hexlobular arrangement, moreover, has the disadvantage, when optimum results are necessary, of requiring a specialized driver wrench which may not be known and/or available to the end user of a product assembled with fasteners of the hexlobular cavity type. While the patent discloses that a conventional hexagonal wrench can be used, the results of such improvisation may be variable and/or totally unacceptable. The level of torque which can be developed when using the substitute hexagonal wrench is severely limited by the ultimate capacity of the substitute wrench and by the contact geometry which results from the nearly incompatible profiles of the hex-lobular shape and the simple hexagonal configuration.

The use of TORX type hex-lobular recesses has been adapted by large companies for assembly line use due to the increase in the driving tool life. Problems have been encountered by users of these end products, especially automobiles and trucks, in that the driving tools to remove and retighten these fasteners are not readily available and it is difficult to determine which size driver to use. When one does find the appropriate driver, it is usually relatively expensive and of limited future utility.

SUMMARY OF THE INVENTION

The invention provides a fastener with a drive socket that is adapted to be effectively used with a variety of hex-configured drivers. The drive socket according to the invention has its root profile described by components of a common regular hexagon and its major profile described by individual trapezoidal sectors centered about and outlying corners of the root hexagon.

The angular character of the disclosed drive cavity profile is relatively simple to generate and measure. As a result, the manufacture of threaded fasteners embodying the invention is comparatively simple, and therefore economical. Contributing to the manufacturing simplicity and economy is the ability of the disclosed profile to be gauged both in cavity forming tools used in the manufacture of the fastener and in the dimensional uniformity of the fasteners themselves.

An important feature of fasteners embodying the invention is their versatility and effectiveness in coupling with a variety of driver configurations. The fastener cavity according to the invention can be effectively driven with standard hex-lobular wrenches, hex-lobal drivers, and hexspline drivers. Compatibility with these existing styles of driver elements has significant benefits to original equipment manufacturers using the fasteners and to the ultimate consumer or user of products employing these fasteners. For example, it is of significant advantage that the fastener of the invention can be used with a premium drive bit or wrench such as the hex-lobular drive bit marketed under the trademark TORX. In this case, any tendency of the fastener to wear or permanently distort when excessive torque loads are applied is reduced, and, of course, is not cumulative. Although wear in the driver is ordinarily cumulative during its use, the demonstrated high durability of the hex-lobular design can extend the expected service of such a driver. In the field, a repair man unfamiliar with or not in possession of a hex-lobular wrench bit can use a standard hexagonal wrench or a hex-spline driver with the disclosed fastener cavity.

DESCRIPTION OF THE PREFERRED EMBODIMENT

Figure 1:
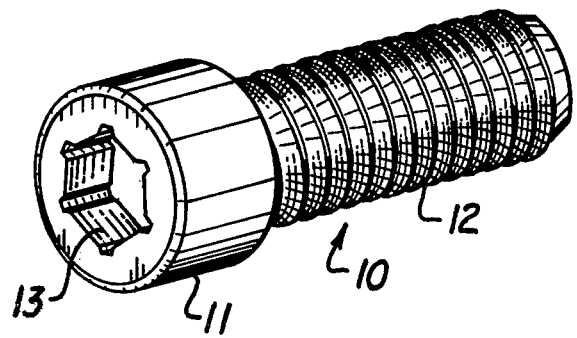
FIG. 1 is a perspective view of a socket head threaded fastener embodying the invention.
Figure 2:
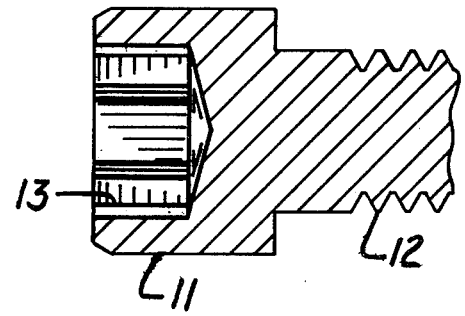
FIG. 2 is a cross-sectional view, taken in a plane extending longitudinally of the fastener of FIG. 1.

Referring now to the drawings, and particularly to FIGS. 1 and 2, there is shown a threaded fastener 10 having a socketed head 11 and an externally threaded shank 12. The helically threaded shank 12 defines the longitudinal axis of the fastener 10 while the surfaces of its threads, when engaged with a mating part, convert applied rotary motion of the fastener about the axis to axial motion along the axis. The fastener 10 can be fabricated of any desired metal, plastic, or the like in any suitable conventional manner. The head 11 includes a drive cavity 13 having a novel cross section or profile in a plane perpendicular to the axis of the fastener 10. As will be understood from the discussion below, the drive cavity profile has its geometric center coincident with the axis of the fastener 10. Desirably, the cavity or socket 13 is bounded by a substantially prismatic projection of a multi-sided, generally angular profile 14 schematically shown in FIG. 3. The cavity 13 can deviate from the ideal of a prism by whatever slight draft angle, if any, is good manufacturing practice.

The profile or cavity cross section 14 is a composite of portions of a root hexagon 16 and trapezoidal sectors 17 centered on each corner of the hexagon so as to increase the size of the area of the hexagon. As shown, at least approximately one-third of the radial height of the trapezoidal sectors 17 lies outside of the corners of the root hexagon 16. Each of the trapezoidal sectors 17 has short sides 18 which, in the illustrated case, lie at an angle of 60 degrees relative to one another. A radially outer side 19 of a trapezoidal sector 17 is arcuate and concentric with the geometric center, designated 21, of the root hexagon 16 which, it will be understood, is coincident with the axis of the fastener 10. The radially outer side 19 of the trapezoidal sector 17 is arcuate to facilitate manufacture of tooling for forming the cavity 13 and making the cavity itself. Where desired, however, the side 19 can be made straight or flat and identical to the chordal length of the illustrated outer side or arc 19.

Figure 3:
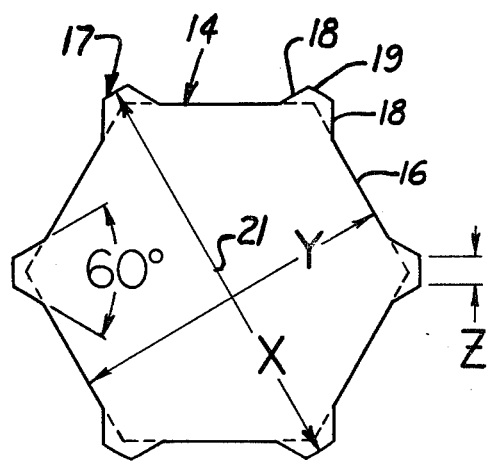
FIG. 3 is a schematic representation of the geometry of the drive cavity of the invention.

The dimension Y indicated in FIG. 3 is the nominal size of the base hexagon, i.e., the distance across opposite sides of the hexagon. Conveniently, this dimension Y corresponds to standard commercial sizes of hexagonal wrench bits with a slight enlargement to provide a suitable clearance fit where desired with such wrenches. The dimension X indicated in FIG. 3 as the major distance across opposite trapezoidal sectors is given by the formula $$X = (1+A)Y$$

where A ranges between 0.16 to 0.22, and is preferably about 0.2.

The dimension Z, the chordal length of the outer sides 19 of the trapezoidal sector 17, is as follows:

$$Z = 0.1X$$

The external surface of the head 11 can take any desired configuration, e.g., a cylinder, hemisphere, cone, etc. Ideally, the cavity 13 has a depth approximately equal to 0.7 of the Y dimension. The drive cavity 13 of the invention is compatible with a variety of drive elements, including those illustrated in FIGS. 4 through 6.

Figure 4:
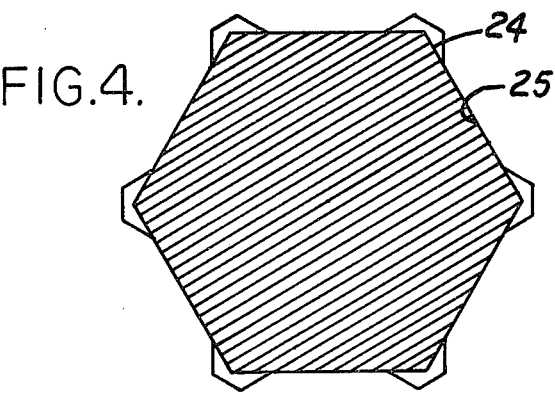
FIG. 4 is a diagrammatic representation of the drive cavity and its compatibility with a standard hexagonal wrench bit.

FIG. 4 illustrates the fit of a conventional hexagonal wrench or bit 24 in the cavity 13. The cavity wall surfaces 25, corresponding to the base hexagon 16, directly confront a major portion, i.e., more than half, of the surface area of the wrench 24 inserted in the cavity. As a result, contact pressures between the wrench 24 and cavity 13 remain moderate even when relatively high torque loads are imposed by the wrench.

Figure 5:
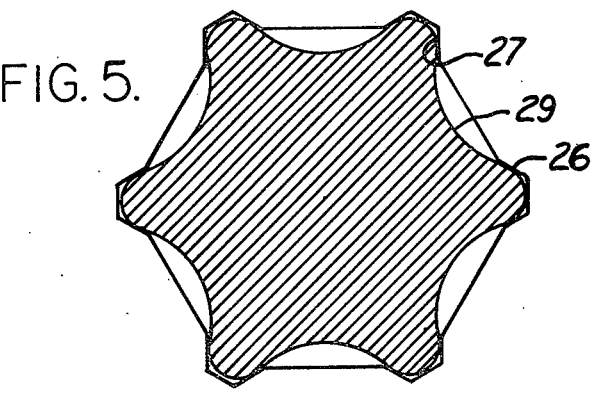
FIG. 5 is a diagrammatic representation of the drive cavity and its compatibilty with a hex-lobular wrench bit.

FIG. 5 illustrates the compatibility of the cavity 13 with a hex-lobular type of wrench driver 29. The driver profile depicted in FIG. 5 is representative of the type disclosed in aforementioned U.S. Pat. No. 3,584,667 and marketed under the registered trademark TORX. Use of the hexlobular wrench 29 with the disclosed drive cavity 13 is characterized by a high potential torque transfer capacity and low wear rate in the wrench when used in high volume production applications. The high torque capacity results from the engagement of the wrench lobes 26 with areas of the sector side surfaces, designated 27, and corresponding to the thread sides 18 of the trapezoidal sectors of the profile of FIG. 3, which are advantageously disposed at a relatively long radius from the axis of the fastener 10. At the same time, the line of contact force which is normal to the plane of contact between a lobe 26 and sector sidewall 27 has a relatively large component in the direction perpendicular to a radius drawn to this point of contact from the axis of the fastener 10. If the applied torque is excessive, the principal distortion and wear are borne by the cavity 13 rather than the hex-lobular wrench 29. As such, wear is not cumulative on the wrench 29, so that a significantly extended service life of the wrench is experienced.

Figure 6:
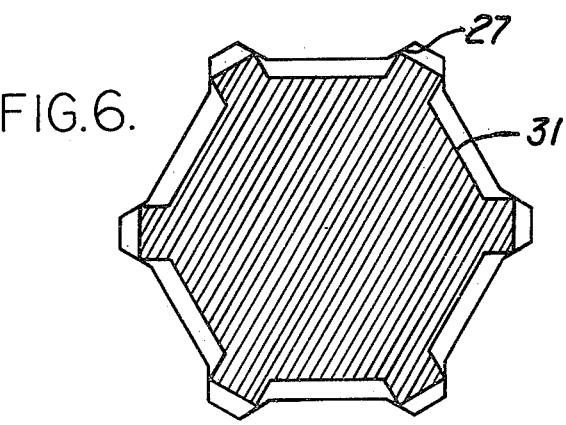
FIG. 6 is a diagrammatic representation of the drive cavity and its compatibility with a hex-spline wrench bit.

FIG. 6 illustrates the compatibility of the drive cavity 13 with a hex-spline wrench 31. As is the case with the hex-lobular wrench relationship discussed above in connection with FIG. 5, the contact points of the hex-spline wrench 31 are disposed in the radially outlying areas of the trapezoidal sectors for potentially high torque transmitting capacity.

It should be noted that the disclosed cavity 13 can be utilized in a setscrew. In a setscrew, the hex-lobular recess is of limited value if it is to be used with a standard hex wrench. An example of this is a ⅜″ setscrew which would normally have a specified hex-lobular standard recess size or a 3/16″ hex recess. The specified hex-lobular recess is expected to accept a reduced size standard 5/32″ hex key. With a hex-lobular driver of the specified size or a 3/16″ hex driver, the maximum tightening torque, based on the driver's strength, is 273 inch/pounds. The reduced size 5/32″ hex key can only provide a tightening torque of 156 inch/pounds. The axial holding power of a setscrew, when tightened with a standard hex-lobular or standard hex bit, is 2200 pounds versus only 1500 pounds when tightened with the smaller hexagonal bit, assuming the smaller hexagonal bit could be utilized to its full capacity in a hex-lobular recess. It is also evident that a hex-lobular recess setscrew, tightened with a hex-lobular bit, cannot be loosened with a standard hex key.

The disclosed cavity 13 can also be used in commercially known quick-acting fasteners, such as the quarter-turn type. These quick-acting fasteners ordinarily rely on cam surfaces which they carry and/or which they interengage on a mating part that converts an applied rotary motion to an axial motion.

It should be evident from the foregoing that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A fastener comprising a body having surface means for converting applied rotary motion about an axis thereof to axial motion along the axis, a wrench receiving cavity opening at one end of the body and symmetrical with the axis, said cavity being defined by a prismatic projection of a multisided composite figure whereby the cavity side surfaces are substantially parallel to the axis, the radially inner margins of the figure being substantially straight and described by midsections of major length of the sides of a base hexagon, the radially outer margins of the figure being described by six individual trapezoidlike sectors each centered on a respective corner of the base hexagon, the sectors including diverging sides, the diverging sides diverging from one another in a direction towards the axis and intersecting the base hexagon, at least one-third of the radial height of the trapezoidal sectors being disposed radially outwardly of the true corners of the base hexagon, said trapezoidal sectors each having a minor side generally bounded by a common circle and its chord drawn to the trapezoid sides, the common circle having a diameter X given by the formula $X=(1+A)Y$ where Y is the distance between opposite sides of the base hexagon and A ranges between 0.16 and 0.22.

2. A fastener having a drive cavity is set forth in claim 1, wherein said diverging sides of each trapezoidal sector diverge from one another at an angle of approximately 60 degrees.

3. A fastener having a drive cavity as set forth in claim 1, wherein said trapezoidal sectors have a radially outermost minor side which is described by an arc concentric with the fastener axis.

4. A fastener having a drive cavity as set forth in claim 1, wherein the chordal length of the trapezoidal sector minor side surfaces have a chordal length Z given by the formula $Z=0.1X$.

5. A fastener body having surface means for converting applied rotary motion about an axis thereof to axial motion along the axis, a drive bit receiving cavity open at one end of the body, the cavity being defined by a primarily flat-faced prism of 24 sides capable of establishing a torque transmitting relationship with a variety of wrenches with configurations based on hexagonal forms, the walls of the cavity being substantially parallel to the axis and including six substantially flat faces corresponding to projections of the midsections of an imaginary base hexagon, said six faces forming the radially inner margin of the cavity, the remaining faces of the cavity being formed as projections of trapezoidal sectors each centered at one of the corners of the imaginary base hexagon and collectively forming the radially outer margins of the cavity, the trapezoidal sectors being formed by two opposed, divergent sides and a radially outer side extending between said divergent sides, the divergent sides diverging from one another at an angle of about 60 degrees in a direction toward the axis of the fastener, each of said outer sides lying at least in part on a common circle having a diameter equal to between 1.16 and 1.22 times the distance between two opposite sides of the base hexagon, the chordal length of said outer sides being generally equal to 0.1 times the diameter of the common circle.

* * * * *